United States Patent [19]

Gunjima et al.

[11] Patent Number: 4,764,619

[45] Date of Patent: Aug. 16, 1988

[54] OPTICALLY ACTIVE COMPOUNDS, SMECTIC LIQUID CRYSTAL COMPOSITIONS CONTAINING THEM AND SMECTIC LIQUID CRYSTAL DISPLAY DEVICES

[75] Inventors: Tomoki Gunjima, Yokohama; Ryutaro Takei, Tokyo; Eriko Aoyama, Yokohama, all of Japan

[73] Assignee: Asahi Glass Company Ltd., Tokyo, Japan

[21] Appl. No.: 842,265

[22] Filed: Mar. 21, 1986

[30] Foreign Application Priority Data

Mar. 26, 1985 [JP] Japan ................................. 60-59593
Apr. 12, 1985 [JP] Japan ................................. 60-76693

[51] Int. Cl.$^4$ ..................... C09K 19/34; C09K 19/30; C09K 19/06; C09K 19/20
[52] U.S. Cl. ........................... 546/226; 252/299.61; 252/299.63; 252/299.64; 252/299.65; 252/299.66; 252/299.67; 252/299.6; 558/415; 558/416; 558/426; 564/161; 564/171; 564/174; 560/1; 560/37; 560/41; 560/45; 560/8; 560/39; 560/42; 560/48; 560/59; 560/73; 560/102; 560/109; 560/66; 560/83; 560/108; 560/118; 560/86; 560/125; 560/126; 560/127
[58] Field of Search ............... 350/350 S; 252/299.61, 252/299.63, 299.64, 299.65, 299.66, 299.67, 299.6; 546/226; 558/415, 416, 426; 560/59, 73, 83, 86, 102, 108, 109, 66, 118, 125, 126, 127, 1, 8, 39, 41, 37, 42, 45, 48; 564/161, 171, 174

[56] References Cited

U.S. PATENT DOCUMENTS

| | | | |
|---|---|---|---|
| 4,167,489 | 9/1979 | Osman | 252/299.67 |
| 4,228,029 | 10/1980 | Osman | 252/299.66 |
| 4,293,193 | 10/1981 | Labes et al. | 252/299.63 |
| 4,349,452 | 9/1982 | Osman et al. | 252/299.63 |
| 4,361,494 | 11/1982 | Osman et al. | 252/299.63 |
| 4,394,070 | 7/1983 | Brown et al. | 350/349 |
| 4,514,045 | 4/1985 | Huffman et al. | 350/351 |
| 4,576,732 | 3/1986 | Isogai et al. | 252/299.65 |
| 4,596,667 | 6/1986 | Inukai et al. | 252/299.65 |
| 4,613,209 | 9/1986 | Goodby et al. | 350/350 S |
| 4,614,609 | 9/1986 | Inoue et al. | 252/299.66 |
| 4,668,427 | 5/1987 | Saito et al. | 252/299.66 |
| 4,676,925 | 6/1987 | Inoue et al. | 252/299.65 |

FOREIGN PATENT DOCUMENTS

| | | | |
|---|---|---|---|
| 84194 | 7/1983 | European Pat. Off. | 252/299.61 |
| 57-149254 | 9/1982 | Japan | 564/171 |
| 58-192856 | 11/1983 | Japan | 546/245 |
| 59-172447 | 9/1984 | Japan | 546/245 |
| 60-38346 | 2/1985 | Japan | 252/299.01 |
| 60-260553 | 12/1985 | Japan | 252/299.67 |
| 681052 | 8/1979 | U.S.S.R. | 564/161 |

OTHER PUBLICATIONS

Japanese Journal of Applied Physics, vol. 22, No. 10, Oct. 1983, pp. L661–L663 (copy attached).
Appl. Phys. Lett. 36(11), 1 Jun. 1980, pp. 899–901 (copy attached).
Mol. Cryst. Liq. Cryst., 1976, vol. 37, pp. 189–211 (copy attached).
Japanese Journal of Applied Physics, vol. 23, No. 3, Mar. 1984, pp. L175–L177 (copy attached).

Primary Examiner—Teddy S. Gron
Assistant Examiner—J. E. Thomas
Attorney, Agent, or Firm—Oblon, Fisher, Spivak, McClelland & Maier

[57] ABSTRACT

An optically active compound having the formula:

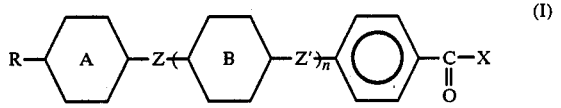

(I)

wherein each of Z and Z' is a single bond, —COO—, —OCO—, —CH$_2$CH$_2$—, —OCH$_2$— or —CH$_2$O—, R is an alkyl group having from 1 to 12 carbon atoms, an alkoxyl group having from 1 to 12 carbon atoms, a cyano group or a halogen atom, each of rings A and B is a 1,4-di-substituted phenylene group or a trans-1,4-di-substituted cyclohexylene group, n is 0 or 1, X is (Abstract continued on next page.)

wherein * indicates an optical center, and R' is an alkyl group having from 2 to 12 carbon atoms or where R" is a hydrogen atom, an alkyl or alkoxy group having from 1 to 12 carbon atoms, provided that when X is

R is the alkyl group or the alkoxy group.

15 Claims, 4 Drawing Sheets

OPTICALLY ACTIVE COMPOUNDS, SMECTIC LIQUID CRYSTAL COMPOSITIONS CONTAINING THEM AND SMECTIC LIQUID CRYSTAL DISPLAY DEVICES

BACKGROUND OF THE INVENTION

1. Field of the Invention

The present invention relates to optically active compounds useful for display devices or electrooptical devices, ferroelectric smectic liquid crystal compositions containing them and ferroelectric smectic liquid crystal display devices.

2. Discussion of the Background

Liquid crystal devices using nematic liquid crystals, which used to be employed for the display portions of watches, electric calculators, etc., have a response speed substantially lower than other display devices such as a light emission diode. Therefore, their application to the fields where a quick response is required, such as to liquid crystal display devices for optical communication systems or printer heads, has been limited.

Recently, liquid crystal display devices using smectic liquid crystals showing ferroelectricity have been reported as liquid crystal display devices showing a quick response (for example, N. A. Clark, S. T. Lagerwall, Appl. Phys. Lett. 36, 899 (1980)).

The ferroelectric smectic liquid crystals include a chiral smectic C-phase and a chiral smectic H-phase. They show a layered structure in which liquid crystal molecules are not perpendicular but inclined to the lamination direction of the layers. The direction of this inclination is such that the liquid crystal molecules are arranged in a spiral form relative to the direction of the lamination of the layers, whereby a spontaneous polarization is created in a direction parallel to these layers and perpendicular to the liquid crystal molecules, thus showing ferroelectricity. This spiral structure is believed to be attributable to the ferroelectricity. A ferroelectric material exhibits a response to an electric field, as a ferroelectric substance. Namely, the direction of the spontaneous polarization will be inverted and the liquid crystal molecules will be rearranged depending upon the direction of the electric field.

It is known that the greater the spontaneous polarization and the lower the viscosity, the quicker the response to the same strength of the electric field. Further, a device using such ferroelectric smectic liquid crystals has a memory property, and researches are being actively conducted to develop a high density display system utilizing this memory property.

Heretofore, various researches have been made on the following Schiff base type compound as a ferroelectric smectic liquid crystal:

p-Decyloxybenzylidene-p'-amino-2-methylbutylcinnamic acid ester (DOBAMBC)

However, such a Schiff base type compound is susceptible to hydrolysis, and thus has a problem that it is likely to be decomposed by moisture.

Further, compounds represented by the following formula II have been known as ester-type compounds showing a chiral smectic C-phase (G. W. Gray et al., Mol. Cryst. Liq. Cryst., 1976, 37 189–211).

where R is a straight chain alkyl group having from 5 to 10 carbon atoms.

However, these ester compounds have a difficulty that their spontaneous polarization is low although they are resistant to moisture.

Recently, a compound having the following formula and referred to as "DOBA-1-MBC" has been reported as a compound having a high spontaneous polarization (K. YOSHINO et al., J.J.A.P., 1984 23, L, 175-177).

(DOBA-1-MBC)

However, this compound is also a Schiff base type and accordingly has a drawback that it is likely to be decomposed by moisture.

SUMMARY OF THE INVENTION

The present invention has been accomplished to solve the above-mentioned problems, and provides an optically active compound having the formula:

wherein each of Z and Z' is a single bond, —COO—, —OCO—, —CH$_2$CH$_2$—, —OCH$_2$— or —CH$_2$O—, R is an alkyl group having from 1 to 12 carbon atoms, an alkoxy group having from 1 to 12 carbon atoms, a cyano group or a halogen atom, each of rings A and B is a 1,4-di-substituted phenylene group or a trans-1,4-di-substituted cyclohexylene group, n is 0 or 1, X is wherein * indicates an optical center, and R' is an alkyl group having from 2 to 12 carbon atoms or where R" is a hydrogen atom, an alkyl or alkoxy group having from 1 to 12 carbon atoms, provided that when X is R is the alkyl group or the alkoxy group.

The present invention also provides a ferroelectric smectic liquid crystal composition containing at least one optically active compound of the formula I.

Further, the present invention provides a smectic liquid crystal display device comprising a pair of electrode plates facing each other with a space and sealed along their periphery and the ferroelectric smectic liquid crystal composition sealed in the space between the electrode plates.

Now, the present invention will be described in detail with reference to the preferred embodiments.

BRIEF DESCRIPTION OF THE DRAWINGS

Referring to the accompanying drawings.

DETAILED DESCRIPTION OF THE PREFERRED EMBODIMENTS

In the compound of the formula I, each of Z and Z' is a single bond, —COO—, —OCO—, —CH$_2$CH$_2$—, —OCH$_2$— or —CH$_2$O—. Generally, the viscosity is low in the case of a single bond, and the upper limit of the temperature (Ts) for the smectic C-phase is high in the case of —COO—. Thus, the single bond or —COO— is preferred.

When n=1, the viscosity tends to be high if both Z and Z' are —COO—. Therefore, in this case, it is preferred that at least one of them is a single bond.

Each of rings A and B is a 1,4-di-substituted phenylene group or a trans-1,4-di-substituted cyclohexylene group. However, generally, the trans-1,4-di-substituted cyclohexylene gives a lower viscosity than 1,4-di-substituted phenylene, and inversely, 1,4-di-substituted phenylene gives a wider range for the smectic C-phase than trans-1,4-di-substituted cyclohexylene. Further, in general, a compound having a large molecular weight has a higher viscosity. Therefore, when n=1, it is preferred that at least one of rings A and B is trans-1,4-di-substituted cyclohexylene. Whereas, when n=0, the molecular weight is not large, and either 1,4-di-substituted phenylene or trans-1,4-di-substituted cyclohexylene may be employed.

R is an alkyl group having from 1 to 12 carbon atoms, an alkoxy group having from 1 to 12 carbon atoms, a cyano group or a halogen atom. In the case of the cyano group, the viscosity tends to be high, and in the case of the halogen atom, Ts tends to be low. Therefore, R is preferably the alkyl group or the alkoxy group. In the case of the alkyl group or the alkoxy group, the melting point tends to be high when the carbon number is small, and the viscosity tends to be high when the carbon number is too high. Therefore, the carbon number is from 1 to 12, preferably from 2 to 8. Each group may be straight-chained or branched. However, the straight chain type is usually preferred since when mixed with other liquid crystalline compounds, the upper limit of the temperature for the smectic C-phase liquid crystals is high.

For the same reasons, if R" is an alkyl or alkoxy group, R" is preferably straight-chained, with the carbon number from 1 to 12, preferably from 2 to 8.

In a preferred embodiment of the present invention wherein X is the optically active ester compounds have the formula I wherein R is a straight chain alkyl group having from 1 to 12 carbon atoms, ring B is a 1,4-di-substituted phenylene group, each of Z and Z' is a single bond, and n is 0 or 1, whereby the compounds have a low viscosity and do not considerably decrease the upper limit of the temperature (Ts) for the smectic C phase and exhibit a high spontaneous polarization.

Further, the following A and B represent preferred optically active amide compounds of the present invention.

(A) An optically active amide compound having the formula I wherein R is a straight chain alkyl group having from 1 to 12 carbon atoms, ring A is a trans-1,4-di-substituted cyclohexylene group, ring B is a 1,4-di-substituted phenylene group, Z is a single bond, Z' is a single bond or —COO—, and n is 1.

(B) An optically active amide compound having the formula I wherein R is a straight chain alkyl or alkoxy group having from 1 to 12 carbon atoms, ring A is a 1,4-di-substituted phenylene group, Z is a single bond or —COO—, and n is 0.

case where two R* or R are shown in the same compound, they may not necessarily be the same groups.

These optically active amido compounds likewise show a low viscosity and do not considerably decrease the upper limit of the temperature (Ts) for the smectic C phase and they usually exhibit a still higher spontaneous polarization than the above-mentioned optically active compounds. Among these, particularly preferred are optically active amide compounds wherein Z and Z' are single bonds.

It is not critical whether the optical rotatory power of the compound of the formula I is levorotatory or dextrorotatory.

When the compound of the formula I is employed for a ferroelectric smectic liquid crystal display device or for an electrooptical device, it is used in combination with other suitable ferroelectric smectic liquid crystals, smectic liquid crystals or other optically active substances to present a chiral smectic C-phase at a desired temperature range in a form of a ferroelectric smectic liquid crystal composition. Further, in order to control the helical pitch or to provide a color display, nematic liquid crystals, non-liquid crystals, dichroic dyestuffs, etc. may be incorporated. The content of the compound of the formula I in the ferroelectric smectic liquid crystal composition of the present invention is from 1 to 90% by weight, preferably from 2 to 50% by weight. If the content is excessive, the upper limit of the temperature for the ferroelectric smectic phase tends to be low, and if the content is too small, the effectiveness to increase the spontaneous polarization tends to be small.

The following compounds may be mentioned as compounds to be mixed with the compound of the formula I to form the ferroelectric smectic liquid crystal composition of the present invention. In the following examples, R* is an optically active alkyl or alkoxy group, and R has no relation with R of the present invention and is a straight chain or branched alkyl or alkoxy group. In a In addition to these compounds, various conventional liquid crystal additives in the form of liquid crystals or non-liquid crystals may be incorporated. For example, the following may be mentioned.

Further, in addition to these compounds, the corresponding compounds in which some of hydrogen atoms on the benzene rings or cyclohexane rings are substituted by halogen, cyano, methyl, etc., may be incorporated. For example, the following compounds may be mentioned wherein the dielectric anisotropy is negative. In the following examples, R has no relation with R of the present invention and is a straight chained or branched alkyl group having from 1 to 12 carbon atoms. In a case where two R are present in the same compound, they may not necessarily be the same groups.

As the dichroic dyestuffs, there may be mentioned dyestuffs which are useful for so-called guest-host type liquid crystal display devices, such as trisazo type or anthraquinone type dyestuffs.

The ferroelectric liquid crystal display device or the electrooptical device comprises a pair of electrode plates (substrate plates having an electrode over the entire surface or a part thereof) facing each other with a space, at least one of the substrate plates being transparent, a sealing material for sealing the substrate plate along their periphery, and a liquid crystal layer sealed in the space between the substrate plates. In such a liquid crystal display device, the space between the substrate plates is preferably from 0.5 to 20 μm. Further, the substrate plates may be treated for parallel orientation control treatment. As such an orientation control means, a orientation controlling layer may be coated over the entire surface or a part thereof, of the electrode plates. As such an orientation control layer, a polymer material having a refractive index of at least 1.5, such as polyimide, is preferred. Further, it is preferred that the liquid crystal device is provided with at least one sheet of a polarizer. At least two such electrode plates are required, but a plurality of such electrode plates may be employed to form a laminated structure.

The compound of the present invention may be prepared, for instance, by the following steps.

(III)

First step ↓

Second step (I)

where Z, Z', R, ring A, ring B, n and X are as defined above.

Namely, a chlorinating agent such as thionyl chloride or phosporus oxychloride is reacted to a carboxylic acid of the formula III to obtain an acid chloride of the formula IV, which is then reacted with an optically active phenethyl alcohol or an optically active secondary amine in the presence of a basic substance such as pyridine, followed by a series of purification treatments such as extraction, recrystallization and column chromatography, to obtain a pure compound of the formula I.

Now, the present invention will be described in further detail with reference to Examples. However, it should be understood that the present invention is by no means restricted by these specific Examples.

EXAMPLE 1

2.82 g (0.01 mol) of a compound of the formula:

was heated together with 10 ml of thionyl chloride and 10 ml of carbon tetrachloride at a refluxing temperature for 4 hours. Then, low boiling substances were removed by an evaporator to obtain a compound of the formula:

as a yellow oily substance. This compound was added to 15 ml of toluene, and the mixture was dropwise added to a mixture comprising 1.35 g (0.01 mol) of a compound of the formula:

4 ml of pyridine and 20 ml of toluene, at a temperature of not higher than 10° C. After the dropwise addition, the mixture was stirred for 6 hours and then poured into 100 ml of 20% hydrochloric acid. Then, the mixture was extracted with toluene. The toluene layer was washed with water and dried over anhydrous magnesium sulfate, and then the solvent was distilled off by an evaporator. The residual brown oily substance was heated together with 30 ml of ethanol, and insoluble substances were removed. After distilling off ethanol, a fraction of 220°–230° C./0.1 mmHg was collected by means of Kugelrohr distillation apparatus, and subjected to alumina column chromatography by using toluene as the developing solvent. Further, the product was recrystallized from 30 ml of hexane to obtain a desired compound of the formula:

Amount: 2.9 g (0.0072 mol), yield: 72%, melting point: 74.0° C.

$[\alpha]_D^{25} = +128°$ (C=0.68, CHCl$_3$, l=10 mm).

Figure 1:
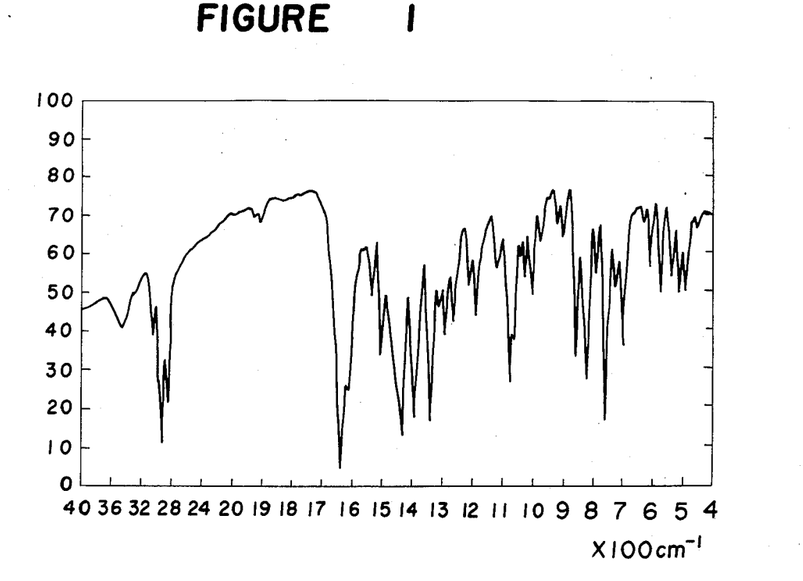
FIGS. 1 to 6 are IR spectra of the compounds of Examples 1, 2, 3, 5, 6 and 7, respectively.

The IR spectrum of this compound is shown in FIG. 1. The $^1$H NMR spectrum of this compound was as follows.

| CDCl$_3$ solvent | TMS internal standard | |
| --- | --- | --- |
| δ 7.7–7.2 | complex m. | 13H |
| δ 2.80 | s | 3H |
| δ 2.70 | t J = 7 Hz | 2H |
| δ 1.95 | d J = 7 Hz | 3H |
| δ 1.4 | broad s | 8H |
| δ 0.93 | distorted t. | 3H |

EXAMPLE 2

The same treatment as in Example 1 was conducted except that instead of the compound of the formula:

3.50 g (0.01 mol) of a compound of the formula:

was used, whereby a desired compound of the formula:

(+)-n-C$_5$H$_{11}$—[H]—◯—◯—C(=O)—N(CH$_3$)—*CH(CH$_3$)—◯ was obtained.

represents a trans-1,4-di-substituted cyclohexylene group.) Amount: 3.0 g (0.0064 mol), yield: 64%, melting point: 136.6° C.

$[\alpha]_D^{25} = +110.6°$ (C=0.92, CHCl$_3$, l=10 mm).

Figure 2:
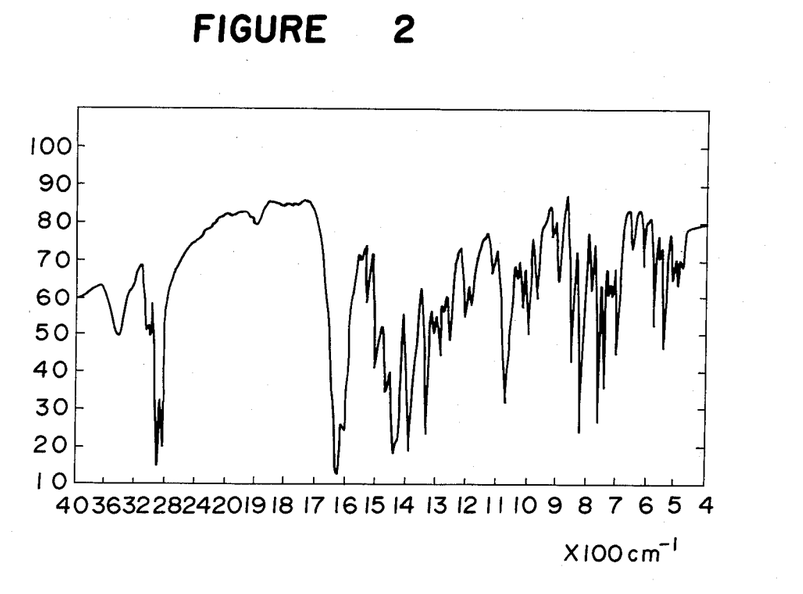

The IR spectrum of this compound is shown in FIG. 2.

EXAMPLE 3

The same treatment as in Example 2 was conducted except that instead of the compound of the formula:

1.43 g (0.01 mol) of a compound of the formula:

was used, whereby a desired compound of the formula:

was obtained. Amount: 2.5 g (0.0053 mol), yield: 53%, melting point: 80.8° C.

$[\alpha]_D^{25} = +23.1°$ (C=0.81, CHCl$_3$, l=10 mm).

Figure 3:
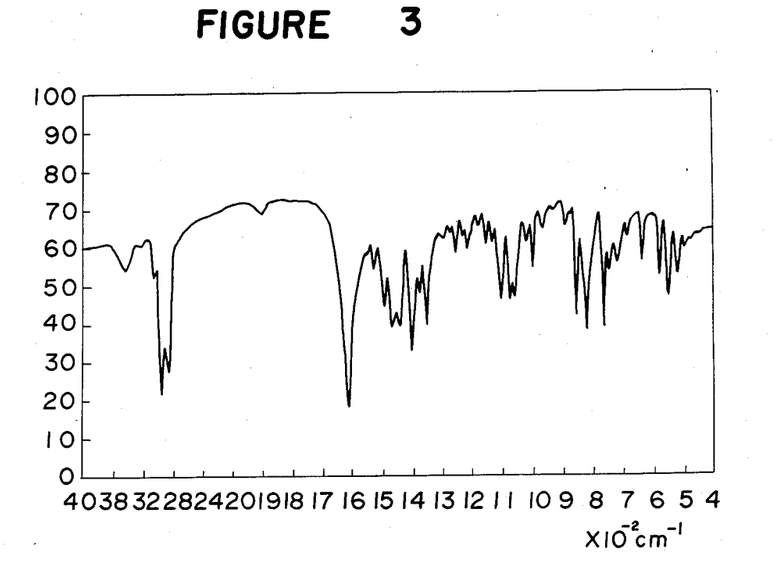

The IR spectrum of this compound is shown in FIG. 3.

EXAMPLE 4

The same treatment as in Example 2 was conducted except that instead of the compound of the formula:

0.99 g (0.01 mol) of (+)-α-pipecoline was used, whereby a desired compound of the formula:

was obtained. Amount: 2.9 g (0.0067 mol), yield: 67%.

EXAMPLE 5

The same treatment as in Example 3 was conducted except that instead of the compound of the formula:

3.26 g (0.01 mol) of a compound of the formula:

was used, whereby a desired compound of the formula:

was obtained. Amount: 3.4 g (0.0075 mol), yield: 75%, melting point: 39.5° C.

$[\alpha]_D^{25} = +14.6°$ (C=0.96, CHCl$_3$, l=10 mm).

Figure 4:
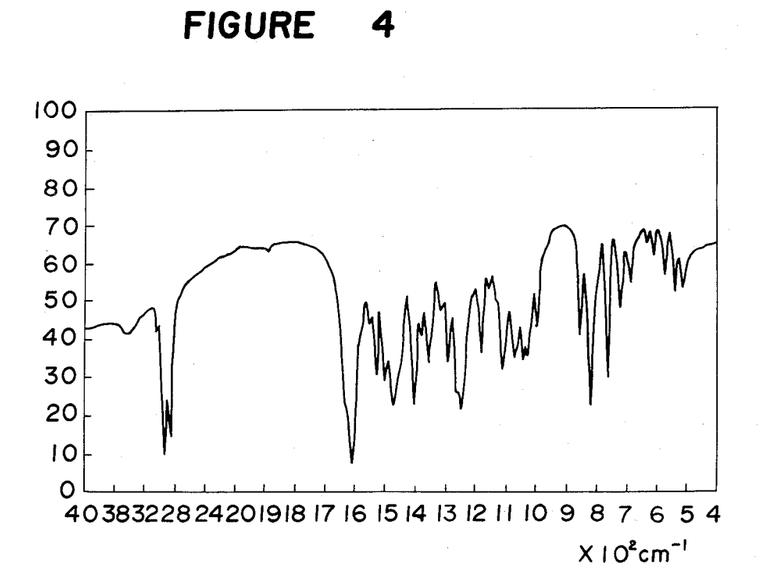

The IR spectrum of this compound is shown in FIG. 4.

EXAMPLE 6

The same treatment as in Example 5 was conducted except that instead of the compound of the formula:

1.35 g (0.01 mol) of a compound of the formula:

was used, whereby a desired compound of the formula:

was obtained. Amount: 2.7 g (0.0061 mol), yield: 61%, melting point: 78.1° C.

$[\alpha]_D^{25} = +117.5°$ (C=0.88, CHCl$_3$, l=10 mm).

Figure 5:
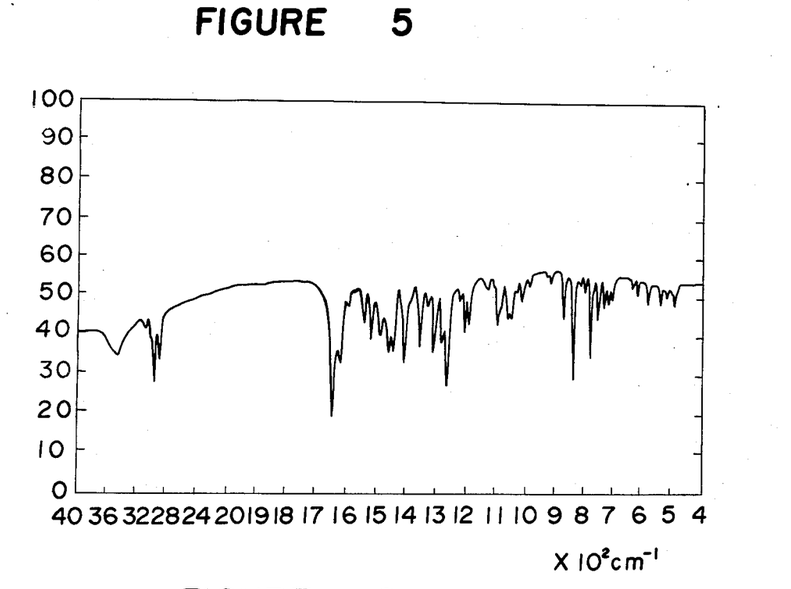

The IR spectrum of this compound is shown in FIG. 5.

In the same manner as in the above Examples, optically active amide compounds having the following formulas are obtainable from the corresponding carboxylic acids and optically active secondary amines.

-continued

-continued

EXAMPLE 7

A mixture comprising 1.75 g (5.1 mmol) of 4'-[4"-n-pentylcyclohexyl)biphenyl-4-carboxylic acid, 2.4 g (20 mmol) of thionyl chloride and 20 ml of carbon tetrachloride, was heated under reflux for 6 hours. Then, the solvent and excess thionyl chloride were distilled off to obtain an acid chloride. The acid chloride was dissolved in 10 ml of toluene, and 0.5 g (4.1 mmol) of L-(−)-α-phenylethyl alcohol and 1 ml of pyridine were added to the solution. The mixture was stirred overnight, and the precipitated pyridine hydrochloride was separated by filtration. The filtrate was washed sequentially with dilute hydrochloric acid, an aqueous NaOH solution and water. The organic layer was dried over anhydrous magnesium sulfate, and then the solvent was distilled off. The residue was recrystallized from ethanol and toluene, and further subjected to toluene-active alumina column chromatography to obtain a compound of the formula:

Melting point: 91.0° C., amount: 1.2 g, yield: 64.5%.

Figure 6:
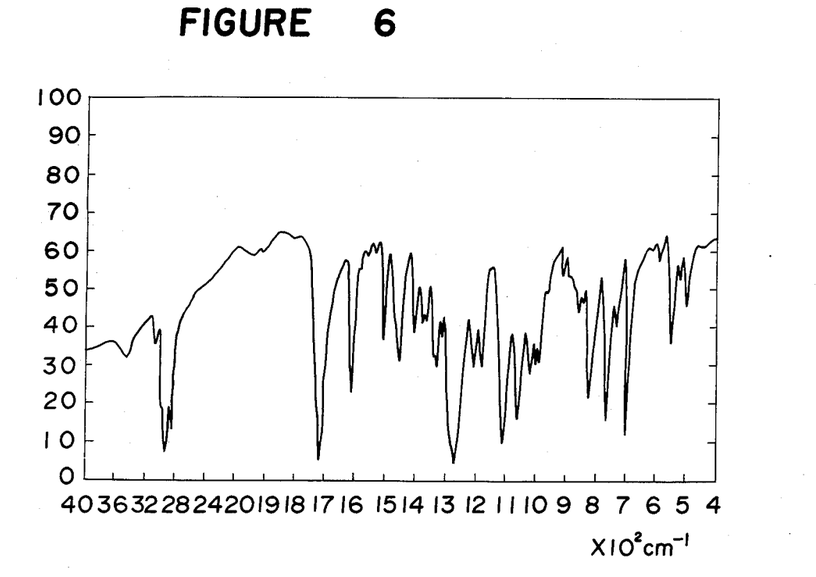
Figure 7:
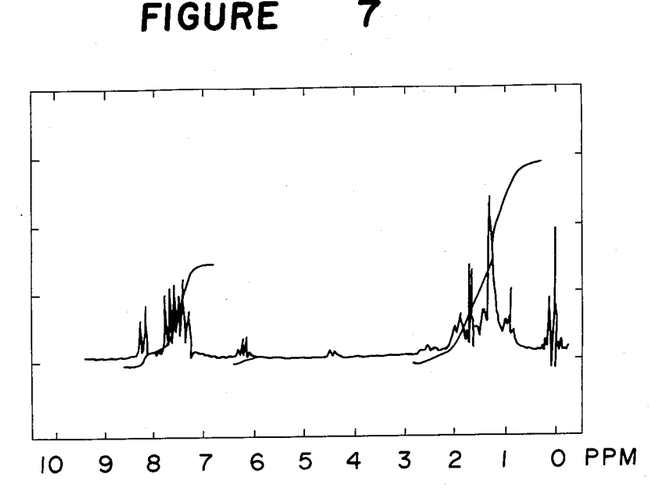
FIG. 7 is a NMR spectrum of the compound of Example 7.
Figure 8:
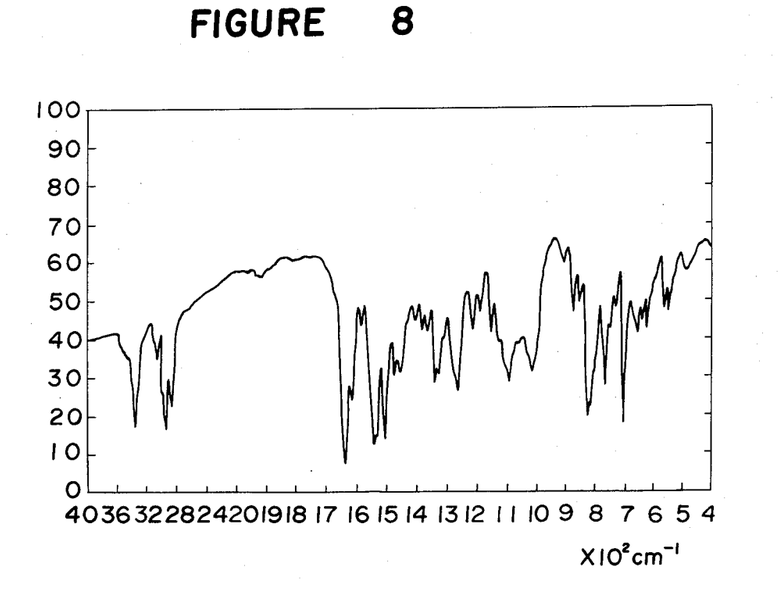
FIG. 8 is an IR spectrum of a comparative compound.

The IR spectrum of this compound is shown in FIG. 6, and the NMR spectrum (CDCl₃ solvent, TMS internal standard) is shown in FIG. 7.

EXAMPLES 8 to 10

In the same manner as in Example 7, the following compounds were prepared from the corresponding carboxylic acids.

(Example 8)

Yield: 69.3%, Melting point: 40.9° C.
$[\alpha]_D^{25} = 30.8°$ (C=0.78, CCl$_4$, l=10 mm).

(Example 9)

Yield: 53.3%, Clearing point: 183.4° C.

(Example 10)

Yield: 62.1%, Melting point: 71.3° C.

In the same manner as the above Examples, optically active ester compounds having the following formulas are obtainable from the corresponding carboxylic acids and optically active phenechyl alcohols.

-continued

EXAMPLE 11

From 5.0 to 15.0% by weight of the compounds of Examples 1 to 3 and 6 to 10 were, respectively, mixed to 4-n-octyloxybenzoic acid 4'-n-hexyloxyphenyl ester (hereinafter referred to as a matrix liquid crystal), and their spontaneous polarization and upper limit temperatures (Ts) for the ferroelectric smectic phase were measured. The measurement of the spontaneous polarization was conducted in accordance with the method of Miyasato et al. wherein a test sample is sandwiched between spacers with a space of 3 μm and sealed in a cell having an electrode surface area of 1 cm², and triangular waves of 20 Hz at 10 V were applied at temperature 10° C. lower than the Ts (K. Miyasato et al., Japan. J. Appl. Phys., 22, L 661 (1983)). The measurement of Ts was conducted by the observation under a polarizing microscope with a hot stage (FP51) manufactured by Metler Co.).

The results are shown in Table 1. As is evident from Table 1, the spontaneous polarization is 3.7 nC/cm² in the case of the conventional ferroelectric liquid crystal compound (DOBAMBC) of the formula:

and 1.8 nC/cm² in the case of the ester-type compound of the formula:

whereas the compounds of Examples 1 to 3 and 6 to 10 exhibit superior spontaneous polarization even when diluted to a concentration of 5.0% by weight in the respective mixtures. Each of the mixtures has a practically sufficiently high Ts.

TABLE 1

| Compounds of Examples | Amount (wt. %) | Transition temperature | | | | Spontaneous polarization nC/cm² |
|---|---|---|---|---|---|---|
| | | SmC* | SmA | Ch | I | |
| Matrix liquid crystal | | 65.0 | — | ° | 89.5 | 0 |
| 1 | 5 | 53.6 | — | ° | 81.7 | 7.9 |
| 2 | 5 | 64.6 | — | ° | 87.5 | 7.3 |
| 3 | 5 | 62.4 | — | ° | 86.6 | 8.3 |
| 6 | 5 | 60.5 | — | ° | 83.9 | 9.3 |
| 7 | 5 | 65.1 | ° | 71.7 | ° | 89.8 | 3.9 |
| | 10 | 54.8 | ° | 74.9 | ° | 88.0 | 5.5 |
| 8 | 5 | 55.6 | — | | ° | 82.6 | 5.1 |
| 9 | 5 | 67.0 | °˙ | 75.8 | ° | 91.1 | 3.1 |
| 10 | 5 | 64.4 | — | | ° | 84.9 | 5.8 |
| | 10 | 59.4 | — | | ° | 80.7 | |
| | 15 | 47.3 | ° | 63.4 | ° | 73.6 | |

Remark: "— and ° indicate the absence and the presence of the phase respectively."

As is evident from Table 1, these compositions have practically sufficiently high upper limit temperatures for the chiral smectic C-phase.

EXAMPLE 12

The mixtures containing the compounds of Examples 2 and 7, as used in Example 11, and DOBAMBC, were put into sample tubes, respectively, and left to stand at a temperature of 80° C. under a humidity of 90% for 20 hours, and the change in Ts as between before and after the test was investigated.

DOBAMBC is a Schiff base type compound and susceptible to hydrolysis. Accordingly, Ts decreased from 93.0° C. to 76.1° C. i.e. as much as 16.9° C. Whereas, the mixture of the present invention containing the compound of Example 2 showed only a decrease of 0.3° C. from 64.6° C. to 64.3° C. Likewise, the mixture containing the compound of Example 7 showed only a reduction of 0.3° C. from 65.1° C. to 64.8° C.

COMPARATIVE EXAMPLE

The same treatment as in Example 1 was conducted except that instead of the compound of the formula:

1.21 g (0.01 mol) of a compound of the formula:

was used, whereby a compound of the formula:

was obtained. Amount: 2.7 g (0.0070 mol), yield: 70%, melting point: 167.6° C.

$[\alpha]_D^{25} = +36.1°$ (C=0.78, CHCl₃, l=10 mm).

This compound has a melting point higher as much as 93.6° C. than the compound of Example 1 and has poor compatibility.

The present invention provides an optically active compound of the formula I which has high spontaneous polarization and excellent chemical stability, and a ferroelectric smectic liquid crystal composition containing at least one of the compounds, whereby it is possible to obtain a display device or an electrooptical device having excellent dependability and capability for quick response.

What is claimed is:

1. An optically active compound having the formula:

wherein each of Z and Z' is a single bond, —COO—, —OCO—, —CH₂CH₂—, —OCH₂— or —CH₂O₂—, R is an alkyl group having from 1 to 12 carbon atoms, an alkoxy group having from 1 to 12 carbon atoms, a cyano group or a halogen atom, each of rings A and B is a 1,4-di-substituted phenylene group or a trans-1,4-disubstituted cyclohexylene group, n is 0 or 1, X is wherein * indicates an optical center, and R' is an alkyl group having from 2 to 12 carbon atoms or where R" is a hydrogen atom, an alkyl or alkoxy group having from 1 to 12 carbon atoms.

2. The compound according to claim 1, wherein R in the formula I is a straight chain alkyl or alkoxy group.

3. The compound according to claim 2, wherein in the formula I, R is a straight chain alkyl group having from 1 to 12 carbon atoms, ring A is a trans-1,4-disubstituted cyclohexylene group, ring B is a 1,4-di-substituted phenylene group, Z is a single bond, Z' is a single bond or —COO—, and n is 1.

4. The compound according to claim 3, wherein Z' in the formula I is a single bond.

5. The compound according to claim 2, wherein in the formula I, R is a straight chain alkyl or alkoxy group having from 1 to 12 carbon atoms, ring A is a 1,4-disubstituted phenylene group, Z is a single bond or —COO—, and n is 0.

6. The compound according to claim 1, wherein n=0 and Z in the formula I is a single bond.

7. The optically active compound of claim 1, wherein X is —N(CH₃)—*CH(CH₃)—R'.

8. The optically active compound of claim 7, wherein R' is an alkyl group having from 2 to 12 carbon atoms.

9. The optically active compound of claim 7, wherein R' is a group —p—C₆H₄—R", where R" is a hydrogen atom, a C₁₋₁₂ alkyl group or a C₁₋₁₂ alkoxy group.

10. The optically active compound of claim 5, wherein Z is a single bond.

11. The optically active compound of claim 1, wherein n=0.

12. The optically active compound of claim 1, wherein R is a straight C₂₋₈ alkyl group or a straight C₂₋₈ alkoxy group.

13. The optically active compound of claim 1, wherein A is paraphenylene.

14. The optically active compound of claim 1, wherein R is a C₂₋₈ alkyl group.

15. The optically active compound of claim 1, wherein R is a C₂₋₈ alkoxy group.

* * * * *